Oct. 5, 1965  E. B. FRANKLIN ETAL  3,210,708
MAGNETIC CORE HAVING JOINTS OF ZIG-ZAG CONFIGURATION
WITH RESIN CLAMPING MEANS
Filed April 16, 1962
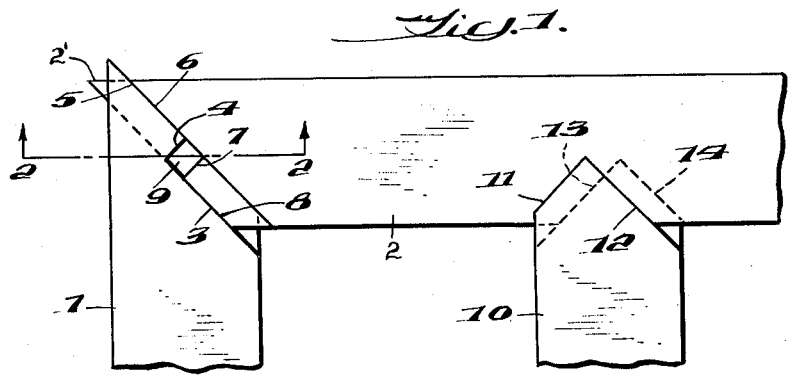
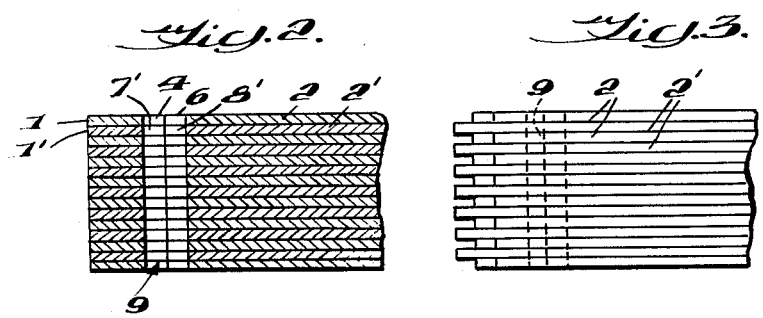
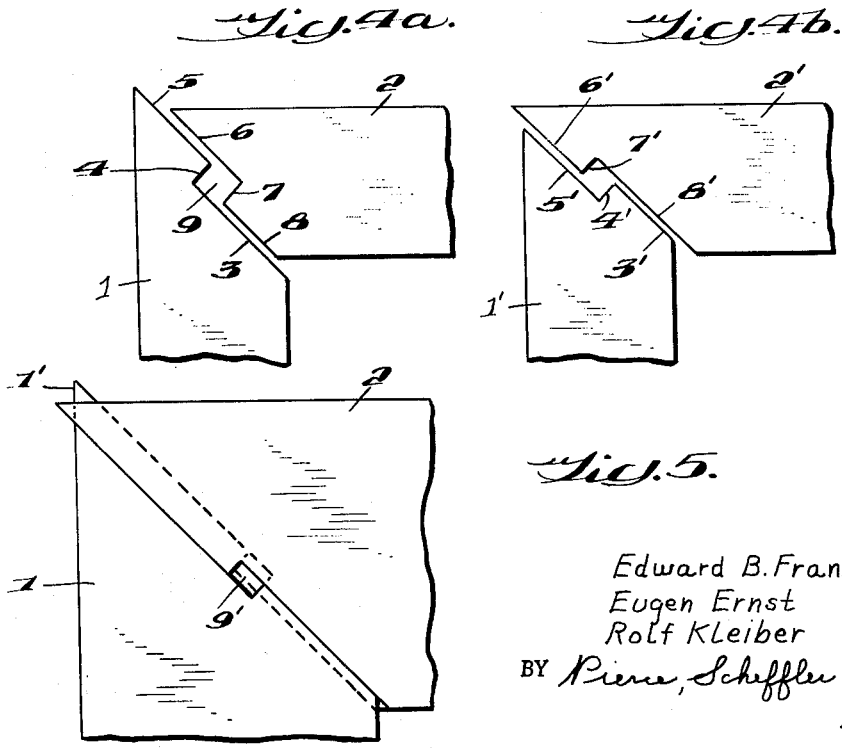
INVENTORS
Edward B. Franklin
Eugen Ernst
Rolf Kleiber
BY Pierce, Scheffler & Parker
ATTORNEYS United States Patent Office 3,210,708
Patented Oct. 5, 1965

3,210,708
MAGNETIC CORE HAVING JOINTS OF ZIG-ZAG CONFIGURATION WITH RESIN CLAMPING MEANS
Edward B. Franklin, Eugen Ernst, and Rolf Kleiber, St. Johns, Quebec, Canada, assignors to Aktiengesellschaft Brown, Boveri & Cie., Baden, Switzerland, a joint-stock company
Filed Apr. 16, 1962, Ser. No. 187,544
Claims priority, application Switzerland, Apr. 14, 1961, 4,497/61
3 Claims. (Cl. 336—217)

The invention relates to a magnetic core in which the legs and the yokes are connected by bevelled surfaces.

The bevel at the joint between yoke and leg is intended, in the case of grain-oriented laminae with a preferential magnetic direction, to deflect the flux from the leg to the yoke with a minimum loss.

For further improvement of flux transition, the bevel jointed laminae are arranged in consecutive, overlapping joints. An improvement in the transition occurs in that the laminae of the yoke and the leg are alternately longer than the other laminae. In addition to the proposed improved union of flux paths, this structure provides better mechanical stiffening of the magnetic circuit.

It has further been proposed to make the bevel in a special manner such that the angle in relation to the direction of the leg is only in part 45°, and is made elsewhere in another direction. This gives rise to broken lines. On one side, for example in the yoke laminae, special protrusions have been provided, engaging in corresponding reverse-formed parts in the leg laminae. The entire magnetic unit may thus be further strengthened. However, this is not sufficient to hold the core together without external aids, for example clamps.

According to the invention, the bevel is made as a zig-zag. If the overlapping of the laminae is such that the zig-zag line is arranged in reverse sense in consecutive laminae and if the zig-zag lines of the leg are unequal in length, there results at the overlap an opening which may be used for the insertion of a bolt. Special externally fitted clamps may then be omitted.

The invention is further illustrated in the accompanying drawings showing preferred structures, and in which:

FIG. 1 is a view in side elevation of a corner portion of the improved magnetic circuit showing the leg part 1 and the yoke part 2 joined together in accordance with the principle of the invention and which provides for an opening through the overlapped end portions of the yoke and leg parts to receive a clamping bolt or other fastening means by which the laminations of the yoke and leg can be held together;

FIG. 2 is a section taken on line 2—2 of FIG. 1;

FIG. 3 is a top plan view of the end part of the yoke;

FIG. 4a is a view similar to FIG. 1 showing the zig-zag beveled end structure of one layer of the laminations;

FIG. 4b is a view similar to FIG. 4a showing the zig-zag beveled end structure of the lamination layer located beneath the one shown in FIG. 4a; and FIG. 5 is a view similar to FIG. 1 but showing a slightly modified construction wherein the overlap of one leg of the zig-zag is less than that of the other leg.

With reference now to the drawings in particular, adjacent laminations forming the leg of the magnetic structure are indicated at 1 and 1' respectively, and adjacent laminations forming the yoke of the magnetic structure are indicated at 2 and 2', respectively. The leg laminations 1 alternate in the lamination stack with the leg laminations 1' and the yoke laminations 2 alternate in the lamination stack with the yoke laminations 2'. Thus, one lamination layer comprises the jointed laminations 1 and 2, and the next immediate lamination layer comprises the jointed laminations 1' and 2'.

As can be seen from the drawings, the corner portions of the laminations in each layer to be joined in a butt joint are beveled along an angle of 45° but the bevel lines are not rectilinear. Rather they have a zig-zag configuration and the zig-zags of adjacent lamination layers are reversed and have unequal lengths so as to develop at the overlap an opening, which in the embodiment of FIG. 1 is an opening with a square configuration, these openings being, of course, in alignment so as to pass a bolt or other fastening means through the same to hold the laminations pressed together.

In FIGS. 1 and 4a, the zig-zag bevel line at the end of lamination 1 is constituted by three sections 3, 4 and 5. The two end sections 3 and 5 which are parallel and lie at an angle of 45° to the side edges of the leg lamination 1 are of unequal length, section 3 being longer than section 5, and the two sections are offset from one another by a comparatively short section 4 normal to the sections 3 and 5. The zig-zag bevel line at the end of lamination 2 is also constituted by three sections 6, 7 and 8. The two end sections 6 and 8 are parallel and lie at an angle of 45° to the side edges of the yoke lamination 2 and are also of unequal length, section 6 being longer than section 8, and the two sections are offset from one another by a comparatively short section 7 normal to sections 6 and 8. The offsetting line sections 4 and 7 are parallel and are spaced from each other by a distance corresponding generally to the distance between the line sections 4 and 7 so as to develop a substantially square opening 9. However, this need not be necessary the case in the event a somewhat oblong opening is desired as shown in FIG. 5. In FIG. 4a, the line sections 5, 6 and 3, 8 which will actually abut one another are shown in a slightly spaced apart relation so as to more clearly show the construction.

FIG. 4b shows the leg and yoke laminations 1' and 2' which lie immediately under the laminations 1 and 2 shown in FIG. 4a. In FIG. 4b, the zig-zag bevel line at the end of lamination 1' is also constituted by three sections 3', 4' and 5'. The two end sections 3' and 5' are also parallel and lie at an angle of 45° to the side edges of lamination 1' and are also of unequal length, but the inequality in length is reversed in relation to lamination 1 since end sections 5' is longer than end section 3'. The offset section 4' is thus separated from section 4 of the adjacent lamination by a distance corresponding to the length of one side of the opening 9. The zig-zag bevel line at the end of lamination 2' is also constituted by the three sections 6', 7' and 8'. The two end sections 6' and 8' are also parallel and lie at an angle of 45° to the side edges of lamination 2' and are also of unequal length, but the inequality in length is reversed in relation to lamination 2 since section 8' is now made longer than section 6'. The offset section 7' is thus separated from section 7 of the adjacent lamination 2 by a distance corresponding to the length of one side of the opening 9.

Thus, as the corner abutting lamination layers 1, 2 and 1', 2' are stacked in alternation, one then establishes a lamination stack in which there is formed a through opening 9 extending through the stack to receive a bolt, not shown, or a similar fastening means to hold the stack of laminations pressed together. In addition, the beveled corner portions of adjacent laminations in the stack have a strengthening overlap, the overlap distance being equal to the length of the offset lines 4 and 7. FIG. 2 shows the through opening 9 clearly, and FIG. 3 which is a top plan view shows the stack of laminations 2, 2' which make up the yoke part. A similar view of the laminations 1, 1' in the leg part would show a like construction.

As an alternative to use of a through bolt passing through the opening 9, one may fill the opening with a plastic substance, for example, aethoxyline resin otherwise known as "Araldite" which, upon setting, secures the laminations tightly together. The through opening 9 establishes entirely by the unique manner in which the corner portions of laminae are joined together, thus avoids the necessity for drilling through the lamination stack which may cause damage to the laminae. The through opening 9 can also be used as an oil passageway for circulating cooling oil through the laminations to cool them.

If the magnetic structure includes a middle leg such as the laminations 10 shown in FIG. 1, a similar bevelled and overlapping junction technique is employed. Thus, in FIG. 1, lines 11 and 12 represent the junction of one lamination of leg 10 and yoke lamination 2, and lines 13, 14 represent the junction for the lamination next below.

As previously explained, one can obtain the desired overlapping and also achieve the through opening by a slightly modified arrangement as shown in FIG. 5 by so dimensioning the parts that the overlap for one leg of the zig-zag at the bevel line is less than that of the other leg. This results in a construction wherein the rectangular opening 9' has a dimension along the side normal to the 45° bevel line which is much shorter than the side parallel to the 45° line. The opening 9' is thus of much smaller cross section than the hole 9 in the embodiment of FIGS. 1–4 and the length of the shorter side need be only so large as to accommodate the fastening bolt. This construction is of advantage with the larger sizes of magnetic core structures as are used, for example, in the larger size transformers.

The advantage of the arrangement is to obtain internal strength exclusively from laminating the material, without any additional manufacturing steps.

We claim:
1. In a magnetic core structure of the stacked lamination type, and wherein said core includes stacked laminations such as a leg part and a yoke part the terminal edges of which are bevelled and meet in a butt joint, the improvement wherein each said bevelled edge has a zig-zag configuration constituted by two end sections of unequal length set off from one another by a comparatively shorter offset section, the zig-zags of the bevelled edges in consecutive lamination layers being reversed in direction so as to establish overlaps in the bevelled joints in consecutive lamination layers, and said offset sections of the zig-zag bevelled edges of each butt jointed lamination layer being spaced from each other to establish in said stack of laminations a through hole perpendicular to the plane of said laminations.

2. A magnetic core structure as defined in claim 1 wherein said through hole is filled with a hardenable resin material such as aethoxyline.

3. A magnetic core structure as defined in claim 1 wherein the overlap of two of the corresponding end sections of the bevelled edges of consecutive lamination layers is greater than the overlap of the other two corresponding end sections of such layers.

References Cited by the Examiner

UNITED STATES PATENTS 2,348,003   5/44   Granfield _____ 336—217
2,810,112   10/57  Zelt et al. _____ 336—210 X

FOREIGN PATENTS 735,228   4/52   Great Britain.

JOHN F. BURNS, *Primary Examiner.*

E. JAMES SAX, *Examiner.*